(12) United States Patent
Horesh et al.

(10) Patent No.: US 11,972,333 B1
(45) Date of Patent: Apr. 30, 2024

(54) SUPERVISORY SYSTEMS FOR GENERATIVE ARTIFICIAL INTELLIGENCE MODELS

(71) Applicant: Intuit Inc., Mountain View, CA (US)

(72) Inventors: Yair Horesh, Kfar-Saba (IL); Rami Cohen, Ashkelon (IL); Talia Tron, Shefayim (IL); Adi Shalev, Herzlia (IL); Kfir Aharon, Ness-Ziona (IL); Osnat Haj Yahia, Tayibe (IL); Nitzan Gado, Givatayim (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/215,297

(22) Filed: Jun. 28, 2023

(51) Int. Cl.
*G06N 20/00* (2019.01)
(52) U.S. Cl.
CPC .................... *G06N 20/00* (2019.01)
(58) Field of Classification Search
CPC ........................................... G06N 20/00
See application file for complete search history.

(56) References Cited

U.S. PATENT DOCUMENTS

| | | | | |
|---|---|---|---|---|
| 11,551,652 | B1* | 1/2023 | Pajjuri | G06N 3/088 |
| 11,593,631 | B2* | 2/2023 | Dalli | G06N 3/088 |
| 2017/0161635 | A1* | 6/2017 | Oono | G06N 3/084 |
| 2020/0026416 | A1* | 1/2020 | Bala | G06N 3/047 |
| 2020/0134383 | A1* | 4/2020 | Rhee | G06V 40/172 |
| 2021/0019641 | A1* | 1/2021 | Park | G10L 17/04 |
| 2021/0056386 | A1* | 2/2021 | Murugesan | G06Q 50/08 |
| 2021/0056409 | A1* | 2/2021 | Murugesan | G06N 3/044 |
| 2021/0073630 | A1* | 3/2021 | Zhang | G06N 3/08 |
| 2021/0174192 | A1* | 6/2021 | Zare | G06N 3/04 |
| 2021/0303973 | A1* | 9/2021 | Edwards | G06N 3/08 |
| 2022/0051140 | A1* | 2/2022 | Oi | G06N 20/00 |
| 2022/0198254 | A1* | 6/2022 | Dalli | G06N 5/01 |
| 2022/0198332 | A1* | 6/2022 | Yang | G06F 21/16 |
| 2023/0091610 | A1* | 3/2023 | Tamazlykar | G06N 3/08 706/11 |

(Continued)

OTHER PUBLICATIONS

News text classification based on Bidirectional Encoder Representation from Transformers Deping et al. (Year: 2021).*

(Continued)

*Primary Examiner* — Kakali Chaki
*Assistant Examiner* — Ababacar Seck
(74) *Attorney, Agent, or Firm* — Paradice & Li LLP

(57) ABSTRACT

Systems and methods are disclosed for managing a generative artificial intelligence (AI) model to improve performance. Managing the generative AI model includes using a second generative AI model to generate outputs from similar inputs and comparing the outputs of the generative AI models to determine their similarity. The second generative AI model is trained using fresher training data but may not be manually supervised and adjusted to the level of the generative AI model being managed. As such, an output of the second generative AI model is compared to an output of the managed generative AI model by a classification model to determine a relevance of the output from the managed generative AI model. An output of the classification model is used to perform various suitable policies to optimize the performance of the managed generative AI model, such as providing alternate outputs, preventing providing the output, or retraining the model.

20 Claims, 5 Drawing Sheets

(56) References Cited

U.S. PATENT DOCUMENTS

| | | | | |
|---|---|---|---|---|
| 2023/0237980 A1* | 7/2023 | Pajjuri | ................... | G06N 3/088 84/609 |
| 2023/0252224 A1* | 8/2023 | Tran | ...................... | G06F 40/166 715/256 |
| 2023/0259787 A1* | 8/2023 | David | ...................... | G06N 3/08 706/15 |

OTHER PUBLICATIONS

Triple-GAN: Progressive Face Aging with Triple Translation Loss Fang et al. (Year: 2020).*

Time Series Simulation by Conditional Generative Adversarial Net Fu et al. (Year: 2019).*

ChatGPT: A revolutionary tool for teaching and learning mathematics Wardat et al. (Year: 2023).*

Li et al., "Deep Entity Matching with Pre-Trained Language Models," Association for Computing Machinery (ACM), vol. 14, No. 1 (Year: 2020).

Olson, "Google Shares Drop $100 Billion After Its New AI Chatbot Makes a Mistake" NPR Technology News, published on Feb. 9, 2023, retrieved from internet on Apr. 4, 2023 at https://www.npr.org/2023/02/09/1155650909/google-chatbot--error-bard-shares (Year: 2023).

Ruby, "How ChatGPT Works: The Model Behind the Bot," Towards Data Science, published on Jan. 30, 2023, retrieved from the internet on Apr. 4, 2023 at https://towardsdatascience.com/how-chatgpt-works-the-models-behind-the-bot-1ce5fca96286 (Year: 2023).

* cited by examiner

SUPERVISORY SYSTEMS FOR GENERATIVE ARTIFICIAL INTELLIGENCE MODELS

TECHNICAL FIELD

This disclosure relates generally to the management of generative artificial intelligence model performance, including the implementation and use of a supervisory system to manage a generative artificial intelligence (AI) model to optimize the performance of one or more generative AI models.

DESCRIPTION OF RELATED ART

A generative artificial intelligence (AI) model is a model that is trained to generate content based on prompts to the model. One popular generative AI model is ChatGPT® from OpenAI®. The ChatGPT model receives a user input requesting a text output from the model, and the ChatGPT model generates and outputs text based on the user input. While ChatGPT is one example generative AI model, various other generative AI models exist and are in development, such as InstructGPT, GPT-4, Google® Bard, and so on. To note, generative AI models may be configured to generate content other than text, such as pictures, audio content, or video content. For example, the MidJourney model generates images based on user text provided to the model.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods are disclosed for managing a generative artificial intelligence (AI) model to improve performance. Managing the generative AI model includes using a second generative AI model to generate outputs from similar inputs and comparing the outputs of the generative AI models to determine their similarity. The second generative AI model is trained using fresher training data but may not be manually supervised and adjusted to the level of the generative AI model being managed. As such, an output of the second generative AI model is compared to an output of the managed generative AI model by a classification model to determine a relevance of the output from the managed generative AI model. An output of the classification model is used to perform various suitable policies to optimize the performance of the managed generative AI model, such as providing alternate outputs, preventing providing the output, or retraining the generative AI model.

One innovative aspect of the subject matter described in this disclosure can be implemented as a computer-implemented method for managing a generative artificial intelligence (AI) model. The method includes receiving an input to a first generative AI model. The first generative AI model is trained on a first training set. The method also includes receiving a first output of the first generative AI model based on the input. The method further includes providing the input to a second generative AI model. The second generative AI model is trained on a second training set and at least a portion of the second training set is subsequent in time to the first training set. The method also includes generating a second output by the second generative AI model based on the input. The method further includes providing the first output and the second output to a classification model. The method also includes generating a similarity indication by the classification model based on comparing the first output and the second output. The similarity indication indicates a similarity between the first output and the second output.

Another innovative aspect of the subject matter described in this disclosure can be implemented in a system for managing a generative AI model. An example system includes one or more processors and a memory storing instructions that, when executed by the one or more processors, cause the system to perform operations. The operations include receiving an input to a first generative AI model. The first generative AI model is trained on a first training set. The operations also include receiving a first output of the first generative AI model based on the input. The operations further include providing the input to a second generative AI model. The second generative AI model is trained on a second training set and at least a portion of the second training set is subsequent in time to the first training set. The operations also include generating a second output by the second generative AI model based on the input. The operations further include providing the first output and the second output to a classification model. The operations also include generating a similarity indication by the classification model based on comparing the first output and the second output. The similarity indication indicates a similarity between the first output and the second output.

In some implementations, the system is configured to identify whether the first output is similar to the second output based on the similarity indication. The system may also output the first output for use in response to identifying that the first output is similar to the second output. In some implementations, the system may, in response to identifying that the first output is not similar to the second output, instruct the first generative AI model to generate a third output based on the input, receive the third output of the first generative AI model, provide the second output and the third output to the classification model, and generate a second similarity indication by the classification model based on comparing the second output and the third output (with the second similarity indication indicating a similarity between the second output and the third output).

In some implementations, the system is configured to, in response to identifying that the first output is not similar to the second output, output an indication that the first output is not similar to the second output. The system may also be configured to output the second output for use based on identifying that the first output is not similar to the second output.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
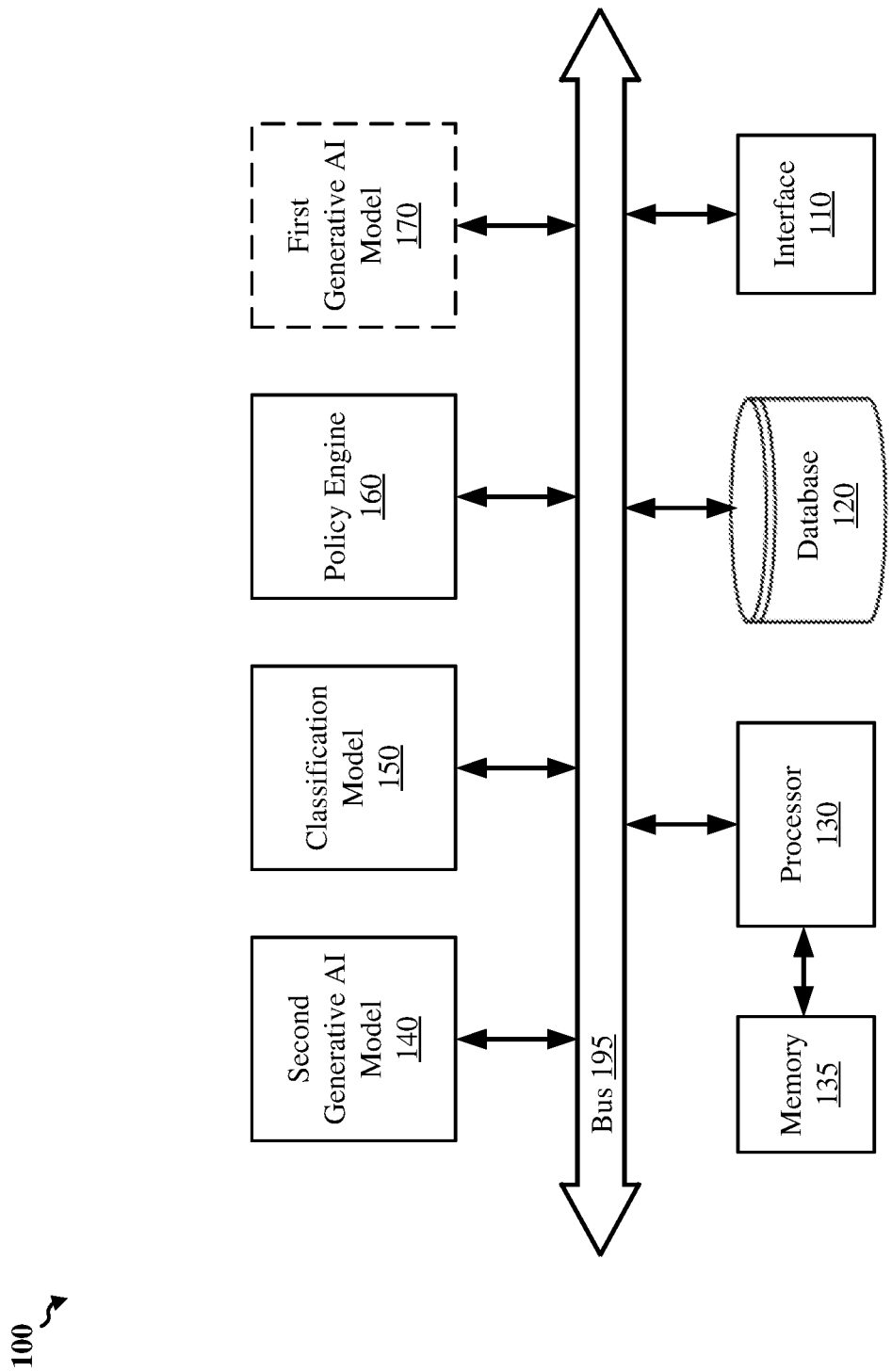
FIG. 1 shows an example system for managing a generative artificial intelligence (AI) model, according to some implementations.

Implementations of the subject matter described in this disclosure may be used for the implementation and use of a supervisory system to manage a generative artificial intelligence (AI) model to optimize the performance of one or more generative AI models. As used herein, a generative AI model refers to an AI model trained to generate suitable content, such as text, images, or other visual or audio information. To note, while the examples herein are with reference to generative AI models that generate text, aspects of the disclosure may apply to generative AI models that generate other types of content.

Generative AI models are typically trained on a large corpus of data and also use such corpus of data to generate the outputs based on outside prompts. For example, many GPT based models perform self-training on publicly available data (such as via the internet) that spans decades, with such data also being used to generate outputs when the generative AI model is in use. After self-training, the generative AI model is typically manually reviewed and adjusted before being available for public use. In the trained GPT model example (such as ChatGPT), developers and testers review the results of the trained GPT model to ensure the relevancy of the outputs and the social acceptability of the outputs. "Social acceptability" as used herein may refer to how socially acceptable and desired are the outputs from the generative AI model. Developers and testers may look for artifacts in the outputs that affect such. For example, generative AI models may suffer from hallucinations, in which information is made up by the model but provided as fact or truth by the model. In another example, generative AI models may generate outputs including profanity or other socially questionable content, as generative AI models typically use publicly available data for self-training and for generation of outputs. Review of the generative AI model's outputs may be used to identify hallucinations or socially questionable outputs so that developers may adjust the model (or the corpus of data used by the model) to remove such unwanted proclivities of the generative AI model. The developers and testers also review the outputs to ensure that the outputs are relevant, such as providing a desired output to the prompt provided to the model.

Such manual review and adjustment takes a long time. For example, the review and adjustment of ChatGPT and its corpus of data used was over years before ChatGPT was made available for public use. A problem with such a long review, though, is that the corpus of data that was used for training the generative AI model is frozen in time at the point when manual review and beta testing of the generative AI model begins. For example, if a generative AI model is reviewed for three years after being trained on internet data, none of the information placed on the internet in the last three years is used by the generative AI model to generate outputs. If review is over a long period of time (such as weeks, months, or years), the data used for training and output generation may be stale, especially in fields that include rapid developments (such as technology, law, medicine, or current events). In addition, the data used by the generative AI model typically remains frozen while the generative AI model is in use, and the data further becomes staler as time passes. As such, there is a need to ensure that outputs of a generative AI model remain relevant over time, potentially including notifying a user as to when such outputs may be irrelevant based on newer data, preventing outputs from being provided, or providing alternate outputs if a user does not object to receiving content that has the potential to be socially unacceptable.

Various implementations of the subject matter disclosed herein provide one or more technical solutions to optimizing the outputs of generative AI models. In some implementations, a computing system is configured to: receive an input to a first generative AI model (with the first generative AI model trained on a first training set); receive a first output of the first generative AI model based on the input; provide the input to a second generative AI model (with the second generative AI model trained on a second training set and at least a portion of the second training set being subsequent in time to the first training set); generate a second output by the second generative AI model based on the input; provide the first output and the second output to a classification model; generate a similarity indication by the classification model based on comparing the first output and the second output (with the similarity indication indicating a similarity between the first output and the second output). The computing system may also be configured to identify whether the first output is similar to the second output based on the similarity indication and performance various policies to optimize the performance of the first generative AI model based on the similarity between the first output and the second output.

Various aspects of the present disclosure provide a unique computing solution to a unique computing problem that did not exist prior to the creation of machine learning models, and in particular generative AI models. Implementation and use of machine learning technology (including generative AI) as described herein cannot be performed in the human mind, much less practically in the human mind, including the use of pen and paper. As such, implementations of the subject matter disclosed herein are not an abstract idea such as organizing human activity or a mental process that can be performed in the human mind.

As described herein, a system is implemented to manage a generative AI model to optimize the performance of the model (including improving the relevancy of outputs generated by the model). To ensure that the outputs generated and provided by a generative AI model are relevant, a second generative AI model is implemented to generate outputs based on the same prompts to the generative AI model being managed, and the outputs from the managed generative AI model and the second generative AI model are compared to determine their similarity. The second generative AI model is trained using fresher data than the managed generative AI model so that outputs from the second generative AI model may be more relevant for, e.g., evolving topics. In this manner, if the managed model is determined to generate a similar output as the second model, the output of the managed model may be determined to still be relevant and thus useful or desired. Based on the similarity between outputs, the system can implement various policies as to how to handle the output of the generative AI model and the generative AI model itself. For example, the system may determine whether to output or prevent outputting the generative AI model's output based on the similarity, or the system may even instruct or indicate that the generative AI model is to be retrained and/or that the training set is to be updated based on outputs between the models being dissimilar, as described herein.

FIG. 1 shows an example system 100 for managing a generative AI model, according to some implementations. The system 100 includes an interface 110, a database 120, a processor 130, a memory 135 coupled to the processor 130, a second generative AI model 140, a classification model 150, and a policy engine 160. In some implementations, the system 100 may also include a first generative AI model 170 that is to be managed by the system 100. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain inputs to one or more generative AI models, obtain outputs from one or more generative AI models not included in the system 100, provide outputs from one or more generative AI models included in the system 100, provide indications or other information to users or to other systems, receive updates or instructions for configuring the one or more generative AI models or the classification model, or receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices (such as to a system hosting the first generative AI model 170 if the model is not included in the system 100 and to a system used by a developer, tester, or other types of users to use the system 100 to manage the first generative AI model 170). For example, an externally developed generative AI model may be hosted by a system associated with the model's developer, and a user may interface with the system 100 in order to use the externally developed generative AI model. In this manner, the system 100 may use the interface 110 to provide a prompt to a user to provide an input to be provided to the first generative AI model 170, receive the input from the user, provide the input to the first generative AI model 170 via a connection and application programming interface (API) to the system hosting the first generative AI model 170 (or via an API of the model 170 within the system 100 if the system 100 hosts the first generative AI model 170), and receive the output of the of the first generative AI model 170. If the system 100 is local to a user, the interface 110 may include a display, a speaker, a mouse, a keyboard, or other suitable input or output elements that allow interfacing with the user (such as to provide a user prompt to receive inputs to the generative AI models, receive the inputs from the user, provide outputs from a generative AI model, provide an indication of the reliability of the model output or other information regarding the model output, and receive or provide other information from or to the user).

The database 120 may store inputs to the generative AI models (such as to the first and second generative AI models 170 and 140), outputs from the generative AI models (such as from the first and second generative AI models 170 and 140), classifications or other indications generated by the classification model 150, or any other objects generated by the generative AI models 140 and 170 or the classification model 150. The database 120 may also store instructions generated by the policy engine 160 to manage the first generative AI model 170, hyperparameters configured for the second generative AI model 140, hyperparameters configured for the classification model 150, or other computer executable instructions or data for operation of the system 100. In some implementations, the database 120 may include a relational database capable of presenting information (such as similarity metrics or other indications of similarities between outputs, the outputs themselves, or other information stored in the database 120) as data sets in tabular form and capable of manipulating the data sets using relational operators. The database 120 may use Structured Query Language (SQL) for querying and maintaining the database 120.

In some implementations, the database 120 may also include the training sets or other data used by the generative AI models (such as the second generative AI model 140) to generate content based on inputs provided to the generative AI model. In some other implementations, the training sets or other data may be stored in one or more servers coupled to the system 100 via the interface 110.

The processor 130 may include one or more suitable processors capable of executing scripts or instructions of one or more software programs stored in system 100 (such as within the memory 135). For example, the processor 130 may be capable of executing one or more applications, the second generative AI model 140, the classification model 150, the policy engine 160, and, in some implementations, the first generative AI model 170. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the second generative AI model 140, the classification model 150, the policy engine 160, and, in some implementations, the first generative AI model 170 that may be executed by the processor 130. The memory 135 may also store inputs, outputs, or other information associated with the components 140-170 of the system 100 or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

The first generative AI model 170 is the model to be managed by the system 100. Managing the generative AI model may include any actions to manage the outputs of the generative AI model (such as preventing the output being provided to a user, adjusting the output to be provided, or providing an alternate output) or manage the generative AI model itself (such as indicating or instructing to retrain the generative AI model, or adjusting the training set used to train the generative AI model or used to generate outputs by the generative AI model). The first generative AI model 170 may be a regulated generative AI model that is publicly available or otherwise available to a large user base. For example, the first generative AI model 170 may be ChatGPT, InstructGPT, Bard, or one of other publicly available or proprietary generative AI models.

The first generative AI model 170 is trained on a first training set. For example, the first training set may be training data over a time range (such as publicly available and scraped internet data over ten years). If the first generative AI model 170 is trained in a specific subject matter, the training set may include data from specific sources or are otherwise relevant to the subject matter during that time span. For example, the first generative AI model 170 may be trained to provide tax advice for specific tax jurisdictions, and include relevant tax information over a ten year period (or another defined period as desired). In such an example, the training data may include legislative documents, codified tax codes, information from the taxation authority, question and answer blogs regarding the matter, or other training data relevant to the model to provide tax advice.

The first generative AI model 170, in being regulated (such as having a long period of manual review and testing), is refined over time by experts (which may include developers and testers) to ensure that outputs of the model 170 meets expectations (such as to remove hallucinations, ensure satisfaction with outputs, remove offensive content, and so on). In addition, such a generative AI model may be fine-tuned for a specific subject matter, which may cause additional latency in release of the model. As a result of manually reviewing and refining the model 170, which may occur over a long period of time (such as months or years), the first training set may include stale training data. In the example of a first generative AI model 170 trained to provide tax advice, if the model is refined over a period of two years or is in production for two years (with the first training set closed to include only the data in the first training set from the ten year time period before the model review and refinement or production), the model may not be configured to handle recent legislative changes to the tax code over the last two years that are not included in the first training set.

In some implementations, the first generative AI model 170 to be managed is included in the system 100. For example, the first generative AI model 170 may be a model that is fined tuned by a company to provide outputs for a specific subject matter, and the company may host the model on system 100 for use by various users (such as via a web portal of a user's device to connect with the system 100 via the interface 110). In some other implementations, the first generative AI model 170 may be external to the system 100. For example, the first generative AI model 170 may be a model hosted by another company or by a separate server of a same company, and the first generative AI model 170 may be accessed by the system 100 via the interface 110 and an API of the first generative AI model 170.

The second generative AI model 140 is a generative AI model trained to generate desired content prompted from an input provided to the generative AI model. The second generative AI model 140 is implemented for managing the first generative AI model 170 (which may be included in or external to the system 100). In particular, the second generative AI model 140 is trained to generate an output to compare to an output from the first generative AI model 170 to determine if the first model's output is relevant. Managing the first generative AI model 170 includes comparing outputs from the first generative AI model 170 to outputs from the second generative AI model 140 to determine a similarity between the outputs.

The second generative AI model 140 is trained on a second training set, with at least a portion of the second training set being subsequent in time to the first training set used to train the first generative AI model 170. For example, if the first generative AI model 170 is trained to provide tax advice (or other advice based on the training) using ten years of training data that ended three years ago (when the first generative AI model 170 is manually reviewed and refined and also made available to users), the second training set may include the training data from the first training set as well as the training data from the last three years. The second training set can include all of the first training set, only a portion of the first training set, or none of the first training set as long as at least a portion of the training set is subsequent in time to the first training set (such as including at least a portion of data that is created during the time that the first generative AI model 170 is reviewed or refined or otherwise since the first training set is closed). In some implementations, the second training set may include potentially objectionable training data (such as data including profanity) that may have been removed from the first training set.

The second generative AI model 140 may be any suitable generative AI model trained to provide suitable outputs similar to the first generative AI model 170. In some implementations, the second generative AI model 140 may be the same basic model as the first generative AI model 170 but trained using the second training set instead of the first training set. In some other implementations, the second generative AI model 140 may be a different basic model that is still capable of generating suitable outputs.

The classification model 150 is to compare the outputs of the first generative AI model 170 and the second generative AI model 140 and generate a similarity indication indicating the similarity between the outputs. For example, an input (such as a user input provided via a prompt) is provided to the first generative AI model 170 and the second generative AI model 140. The first generative AI model 170 generates a first output based on the input, and the second generative AI model 140 generates a second output based on the input. The classification model 150 receives the first output and the second output, compares the outputs, and generates the similarity indication based on the comparison.

If the outputs of the generative AI models 140 and 170 are text in a natural language format, in some implementations of the comparing the first output and the second output, the classification model 150 may include a natural language processor (NLP) to convert the outputs into a format that may be quantifiably compared. For example, the outputs may be converted into vectors that may indicate, e.g., count of relevant words, distance of relevant words from each other, and so on. In some implementations, the classification model 150 may include a bidirectional encoder representations from transformers (BERT) model. A BERT model may convert the first output into a first one or more vectors and convert the second output into a second one or more vectors that may be compared to each other to generate a similarity indication. To note, comparing the first output with the second output may include comparing portions of the outputs or the complete outputs. In some implementations, the generative AI models may be configured to generate a natural language sentence as an output. The output is provided to the classification model 150 (such as to a BERT model) to generate a vector, and the classification model may compare the vector to another vector generated for another output. While a BERT model is described herein as being used for the classification model, any other suitable NLP model may be used, or any suitable variation of the BERT model may be used.

If the generative AI models output more than a sentence, in some implementations, the classification model 150 is configured to parse an output into sentences and convert each sentence into a vector. A vector associated with a sentence of a first output may be compared to different vectors associated with different sentences of a second output. In this manner, sets of vectors may be compared and matched to attempt to compare multiple sentences of a first output with multiple sentences of a second output. To note, while parsing and vectorization is disclosed at a sentence level, parsing and vectorization (or other suitable means of comparison of two outputs) may be performed at any fidelity, such as at the paragraph level, over a defined number of words of a word stream of the output level, and so on.

Figure 2:
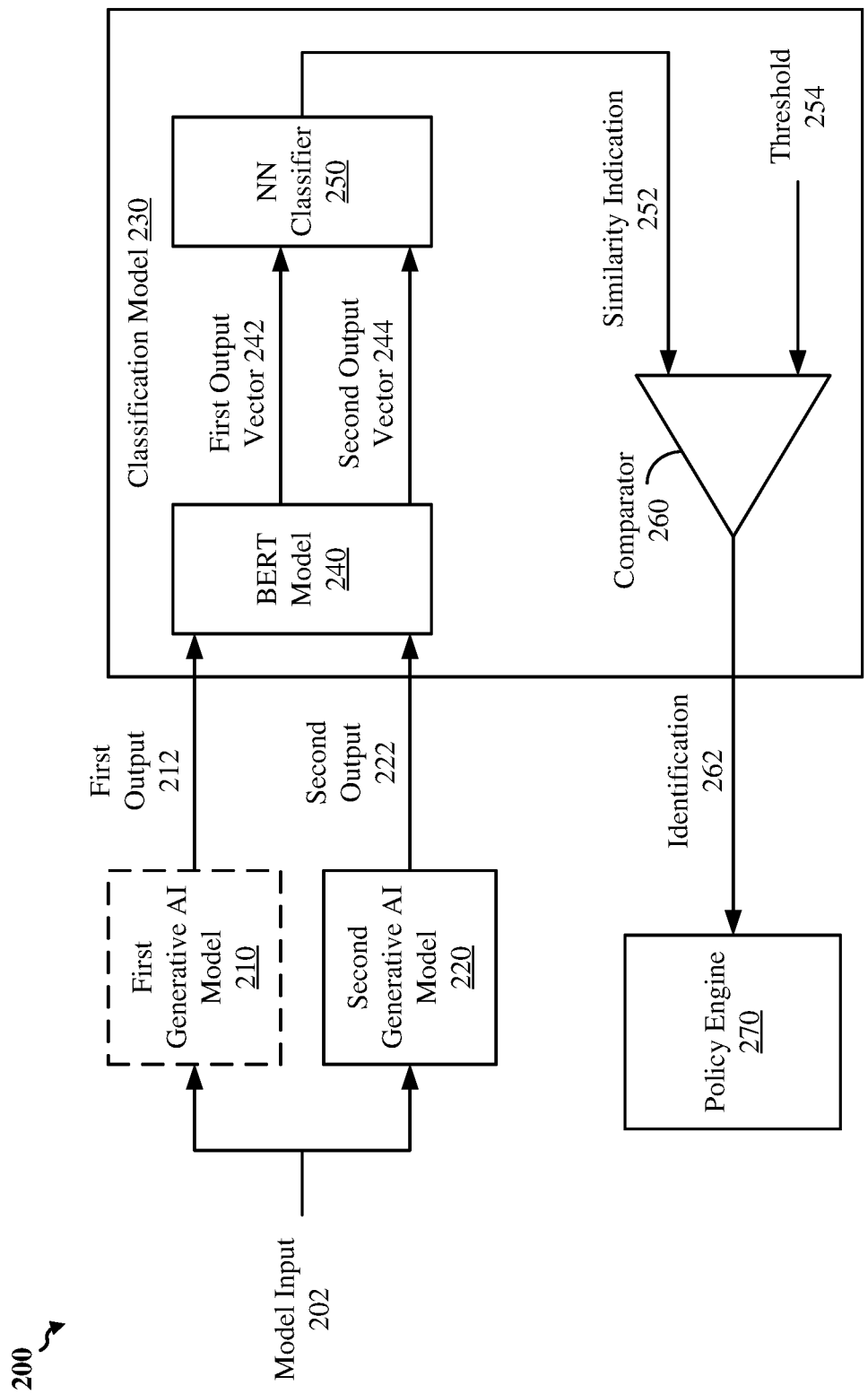
FIG. 2 shows an example configuration of a second generative AI model, classification model, and policy engine for managing a first generative AI model, according to some implementations.

As noted above, comparing the first output with the second output may include comparing a first vector to a second vector generated by the NLP model. In some implementations, the classification model 150 includes a neural network model trained to receive the two outputs from the BERT model and classify whether the two outputs are similar. For example, the neural network may include a deep neural network (or another suitable neural network) that is trained to generate a similarity metric between the outputs (such as between the vectors generated by the BERT model). In an example, if the similarity metric is a value indicating the similarity (such as a value from 0 to 1), the classification model 150 may be configured to compare the similarity metric to a defined threshold (e.g., 0.8 or any other suitable value, which may be defined in any suitable manner) to identify whether the two outputs are similar. An example block diagram of a classification model 150 is depicted in FIG. 2, which is described below. To note, the classification model 150 (as well as the second generative AI model 140) may be implemented in software. For example, the Python programming language may be used to implement the BERT model or another suitable NLP model and the neural network coupled to the BERT model in the classification model 150.

In some other implementations, the classification model 150 may include a regression model (such as being based on one or more of decision trees, gradient boosted trees, random forests, or other classification trees). For example, the classification model 150 may be programmed in the Python programming language, and the XGBoost software library may be used to generate the regression model configured to generate a classification as to the similarity between outputs. Such a regression model may thus be trained to generate the similarity indication, which may include a similarity metric or a decision as to whether outputs are similar.

The policy engine 160 is to execute one or more policies defined for managing the first generative AI model 170 based on the similarity indication. For example, the system 100 may be configured to prevent outputting the first output (such as to a user) from the first generative AI model 170 if a similarity metric from the classification model 150 is less than a defined threshold (thus indicating that the first output may not be relevant or otherwise desired for output). In such an example, the policy engine 160 is configured to prevent output of the first output based on the rule of the similarity metric being less than the threshold. For example, the system 100 may act as a man in the middle between the first generative AI model 170 hosted by another device and a user, or the system 100 may host the first generative AI model 170. As such, with the first output obtained by the system 100 from the first generative AI model 170, the policy engine 160 may instruct the system 100 to prevent providing the first output to the user via the interface 110 based on the similarity metric being less than the threshold. Conversely, the policy engine 160 may instruct the system 100 to provide the first output if the similarity metric is greater than the threshold.

To note, the policy engine 160 may be configured or adjusted to implement any desired policy for managing the outputs of the first generative AI model 170 or the model 170 itself. In some implementations, the policy engine 160 may be configured to instruct the system 100 to indicate to a user that the first output may or may not be relevant based on the comparison. For example, a pop up notification or another suitable indication may be provided to the user to alert the user to the potential relevancy issue with the first output. In some implementations, the policy engine 160 may be configured to instruct the second output from the second generative AI model 140 to be provided alternatively or in addition to the first output. For example, a user may indicate that he or she is ok with receiving potentially offensive material to attempt to receive the most relevant outputs to an input provided by the user. In a specific implementation, the system 100 may provide an indication to the user that the first output is not similar to the second output. The system 100 may also provide a query to the user as to whether the user wishes to receive the second output in addition to or in lieu of the first output. As such, if the user provides approval, the system 100 may provide the second output to the user for use.

In addition to managing the first output based on the similarity indication, another example policy includes retesting the first generative AI model 170 based on determining that the first output and the second output are not similar. For example, when a same input is provided to a generative AI model multiple times, the generative AI model generates a unique output for each instance that the input is provided to the generative AI model. Across the multiple outputs, one of the outputs may be an outlier as not being relevant while the other outputs would be considered relevant. As such, the policy engine 160 may be configured to implement a policy to double check whether the generative AI model provides irrelevant outputs in general to an input or if a specific output is a one off instance of an output being irrelevant. For example, the policy engine 160 may instruct the system 100 to provide the input again to the first generative AI model 170. The first generative AI model 170 generates a third output that is different than the first output generated previously based on the input. The policy engine 160 may further instruct the system 100 (such as the classification model 150) to compare the third output from the first generative AI model 170 to the second output from the second generative AI model 140 to determine whether the second output and the third output are similar (such as generating a second similarity indication indicating a similarity between the second output and the third output). Additionally or alternatively, the input may also be provided to the second generative AI model 140 to generate a new output to compare to the third output to ensure that the second output is not an outlier to the outputs that would typically be generated by the second generative AI model 140.

If the outputs are similar during the second comparison (such as the second similarity indication being greater than a defined threshold or being a positive binary decision that the outputs are similar), the policy engine 160 may instruct the system 100 to output the third output for use (such as to a user). If the outputs remain dissimilar, the policy engine 160 may instruct the system 100 to notify the user of a potential irrelevancy of an output and/or provide the second output (such as described above with reference to policies concerning the first and second outputs). The policy engine 160 may also instruct the system 100 to record the identified dissimilarity, link the dissimilarity to specific keywords of the input or the outputs, etc., to track identified dissimilarities by the classification model 150. Recordation of such may be included in the database 120 or any other suitable means to track the dissimilarities. In this manner, the system 100 may track the number of dissimilarities identified (which may be tracked universally or for specific keywords or topics using one or more counts stored in the database 120). In some implementations, the policy engine 160 may be configured to instruct the system 100 to notify a developer when a threshold number of tracked dissimilarities are reached. Such a notification may indicate that the first generative AI model may no longer be relevant for a specific topic or overall. To note, tracking the dissimilarities may also be based on older identified dissimilarities expiring and thus being removed from being tracked. For example, tracking the number of identified dissimilarities may be over a defined time window, with a log of the dissimilarities tracked being included in a log in the database 120 along with an entry date of each dissimilarity.

Alternative or additional to the system 100 notifying a developer, if the first generative AI model 170 is included in the system 100 or otherwise controlled by an entity operating the system 100, the policy engine 160 may instruct the system 100 to begin retraining the first generative AI model 170 (such as expanding or otherwise adjusting the first training set to include newer training data and training the generative AI model based on the updated training set). In this manner, a new version of the generative AI model may be generated, which may need to be manually reviewed and fine-tuned.

Alternatively or additionally, the system 100 may use the tracked dissimilarities to measure a reliability of a specific generative AI model. In some implementations, while the system 100 is depicted as managing one generative AI model, the system 100 may be configured to manage a plurality of generative AI models. For example, five generative AI models may be configured to generate outputs in a similar subject matter. The system 100 may use outputs from the second generative AI model 140 to compare to the outputs of the five generative AI models for the same inputs and track the identified dissimilarities between the outputs of the second generative AI model 140 and the five generative AI models being managed. The system 100 may thus generate a reliability metric based on the tracked dissimilarities to be able to compare the performances of the five generative AI models (thus indicating which generative AI model provides more relevant outputs as compared to the other four generative AI models). In this manner, a user may be able to compare the generative AI models to select which generative AI model to use. To note, various other policies may be implemented for managing a generative AI model and its outputs, and the disclosure is not limited to the examples provided.

While the second generative AI model 140, the classification model 150, the policy engine 160, and, optionally, the first generative AI model 170, are depicted as separate components of the system 100 in FIG. 1, the components 140-160 (and optionally 170) may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein. If the components are software, the components may be implemented using any suitable computer-readable language. For example, each of the models 140, 150, and optionally 170 and the configuration and interoperability of such models may be programmed in the Python programming language using any suitable libraries.

As noted above, the classification model 150 is configured to compare outputs from the first generative AI model 170 and the second generative AI model 140 to generate a similarity metric, and the policy engine 160 is configured to execute one or more policies to manage the first generative AI model 170 based on the similarity metric. FIG. 2 shows an example configuration 200 of a second generative AI model 220, a classification model 230, and a policy engine 270 for managing a first generative AI model 210, according to some implementations. In some implementations, the configuration 200 is implemented in the system 100 depicted in FIG. 1. In such an implementation, the second generative AI model 220 may be an example implementation of the second generative AI model 140 depicted in FIG. 1, the classification model 230 may be an example implementation of the classification model 150 depicted in FIG. 1, and the policy engine 270 may be an example implementation of the policy engine 160 depicted in FIG. 1. The first generative AI model 210 may be an example implementation of the first generative AI model 170 to be managed by the system 100 depicted in FIG. 1.

The model input 202 is the input to be provided to a generative AI model to prompt the generative AI model to generate an output answering the input. For example, the system 100 (or another suitable system) may provide an input prompt to a user to provide a natural language input to be received by the first generative AI model 210. If another system provides the input prompt to a user (with the first generative AI model 210 external to the system 100), that system may provide the model input 202 provided by the user to the system 100. In this manner, the system 100 may receive the model input 202, which may be provided to the second generative AI model 220 for the second generative AI model 220 to generate a second output 222. In some implementations, providing the model input 202 to the second generative AI model 220 may include using an API of the second generative AI model 220 to provide the text stream of the model input 202 to the model 220. While the model input 202 is depicted as being user provided, the model input 202 may be generated and received in any suitable manner. For example, the model input 202 may be automatically generated by another model, may be an excerpt of previously generated content from a source (such as specific sentences from a publicly available document), and so on.

If the system 100 includes the first generative AI model 210 to be managed by the system 100, the system 100 may provide the model input 202 to the first generative AI model 210 for the first generative AI model 210 to generate a first output 212. If the first generative AI model 210 is hosted by a different system (and thus is external to the system 100), that other system may provide the first output 212 generated by the first generative AI model 210 based on the model input 202 to the system 100. In this manner, the system 100 is able to receive the first output 212.

As noted above, the second generative AI model 220 is trained to generate outputs based on a second training set, with the first generative AI model 210 being trained to generate outputs based on a first training set (with at least a portion of the second training set being subsequent to the first training set). As such, the second generative AI model 220 is to generate similar outputs to the first generative AI model 210 if the outputs of the first generative AI model 210 remain relevant for one or more topics. To determine that the outputs from the first generative AI model 210 are relevant, it is desired that those outputs are similar to corresponding outputs from the second generative AI model 220 based on the same inputs provided to the generative AI models 210 and 220. As such, determining the relevancy of a first output 212 to the model input 202 corresponds to determining a similarity between the first output 212 and the second output 222.

The classification model 230 is to compare the outputs from the first generative AI model 210 with the outputs of the second generative AI model 220 based on a same input to the models 210 and 220. As such, the classification model 230 receives the first output 212 and the second output 222 to compare the outputs. In some implementations, the system 100 uses an API of the classification model 230 to provide the first output 212 and the second output 222 to the classification model. While not depicted in FIG. 2, the outputs 212 and 222 may be formatted in order to provide the outputs to the classification model 230 in a format that can be processed by the classification model. For example, natural language text of outputs 212 and 222 may be segmented into defined segments (such as into a number of words or characters, into sentences, and so on) or otherwise formatted.

As depicted in FIG. 2, in some implementations, the classification model 230 includes a BERT model 240 coupled to a neural network (NN) classifier 250 to generate a similarity indication 252 based on the first output 212 and the second output 222. The BERT model 240 is trained to tokenize the first output 212 to generate a first output vector 242 of tokens and to tokenize the second output 222 to generate a second output vector 244 of tokens. For example, the system 100 may provide the first output 212 and the second output 222 sequentially to the BERT model 240. In this manner, the BERT model 240 may first generate the first output vector 242 and then generate the second output vector 244. To note, each of the vectors 242 and 244 may include one or more vectors based on the defined output of the BERT model 240. If the first output 212 and the second output 222 are segmented into sentences, the sentences may be provided sequentially to the BERT model 240, and the first output vector 242 and the second output vector 244 may include a set of vectors based on the number of sentences provided to the BERT model 240.

The NN classifier 250 (such as a deep NN (DNN)) is trained to compare the first output vector 242 with the second output vector 244. As such, the NN classifier 250 performs vector comparison to generate a similarity indication 252 indicating a similarity between the first output vector 242 and the second output vector 244. The similarity indication 252 may be any suitable indication of the similarity between the outputs 212 and 222 (such as the similarity between the vectors 242 and 244). In some implementations, the similarity indication 252 includes a similarity metric (such as on a scale from 0 to 1) indicating the similarity between the first output vector 242 and the second output vector 244.

If the first output vector 242 and the second output vector 244 include a first set of output vectors and a second set of output vectors, respectively (such as based on the outputs 212 and 222 including a plurality of sentences), the classification model 230 may be configured to provide pairs of a first output vector and a second output vector to the NN classifier 250 in order to compare the different first output vectors of the first set of output vectors to the different second output vectors of the second set of output vectors. For example, if the first set of output vectors includes three vectors and the second set of output vectors includes two vectors, the classification model 230 may provide the six unique pairs for vectors to the NN classifier 250 to generate a similarity indication 252 for each of the unique pairs of vectors (e.g., a total of six similarity metrics). In some implementations, the classification model 230 may match the vectors from the first set of vectors and the second set of vectors as the most similar vectors between the first output vector and the second output vector. For example, from the example of the first set of output vectors including three vectors and the second set of output vectors including two vectors, the classification model 230 may pair the vectors between the two sets in a greedy manner (or alternatively in a more altruistic manner based on an overall match) based on the similarity indications. In the example, a vector may be matched with one vector or more than one vector. For example, two vectors of the first set of output vectors may be matched with a vector of the second set of output vectors. Additionally or alternatively, one or more vectors may remain unmatched (such as if the similarity metrics between the unmatched vector and the vectors of the other set of output vectors is less than a threshold to allowing pairing the unmatched vector to a vector of the other set).

With the NN classifier 250 generating the similarity indication 252 indicating the similarity between the first output and the second output, the similarity indication 252 may be used to execute various policies for managing the first generative AI model 210. In the example implementation of the classification model 230 depicted in FIG. 2, the similarity indication 252 may include a metric (such as on a scale from 0 to 1) indicating the similarity. The classification model 230 may thus include a comparator 260 to compare the similarity indication 252 to a defined threshold 254 to make a binary decision as to whether the first output 212 is similar to the second output 222. To note, the threshold 254 may be defined in any suitable manner, such as being defined by a developer, adjusted by a user, and so on. The comparator 260 generates the identification 262 (such as a binary signal) identifying whether the first output 212 is similar to the second output 222. In some implementations, if the classification model 230 matches vectors from a first set of vectors to a second set of vectors, the classification model 230 may be configured to generate an overall similarity indication across the matched vectors. For example, the similarity indications corresponding to paired vectors may be averaged or otherwise combined to generate an overall similarity indication to be compared to the threshold 254 y the comparator 260. While the comparator 260 is depicted as being included in the classification model 230, the comparator may be included in the policy engine 270. Alternatively, the NN classifier may be configured to generate a binary decision or other type of indication such that a comparator 260 is not included.

While the classification model 230 is one example implementation of a classification model for determining a similarity between a first output 212 and a second output 222, as noted above with reference to the classification model 150 depicted in FIG. 1, the classification model 230 may include any suitable model for determining a similarity between the outputs 212 and 222 (such as a regression model including, e.g., decision trees, gradient boosted trees, a random forest, and so on). As such, the classification model 150 in FIG. 1 is not limited to the example depiction of the classification model 230 depicted in FIG. 2.

A policy engine 270 is implemented to execute one or more policies for managing the first generative AI model 210 based on a relevancy of the first output 212 to the model input 202. As depicted in FIG. 2, the policy engine 270 receives the identification 262 (or alternatively the similarity indication 252) regarding the similarity of the first output 212 and the second output 222. The indicated similarity of the first output 212 and the second output 222 (such as the identification 262 or the similarity indication 252) is received and used by the policy engine 270 as an indication of the relevance of the first output 212 to the model input 202. As noted above in describing the policy engine 160, the policy engine 270 may implement any number of suitable policies. For example, in some implementations, the system 100 may be configured to hold the first output 212 or otherwise prevent the first output 212 from being output for use (such as to a user or to another device) until after the system 100 analyzes the first output 212 for relevancy to the model input 202. In this manner, the policy engine 270 may instruct the system 100 to output the first output 212 for use in response to identifying that the first output 212 is similar to the second output 222. Alternatively, the policy engine 270 may instruct the system 100 to continue preventing output of the first output 212 in response to identifying that the first output 212 is not similar to the second output 222. The policy engine 270 may also instruct the system 100 to output an indication that the first output 212 is not similar to the second output 222 (or otherwise indicate the first output 212 may not be relevant to the model input 202). Additionally, the policy engine 270 may instruct the system 100 to output the second output 222 from the second generative AI model 220 for use is approved or otherwise allowed by a user.

In some other implementations, the policy engine 270 may instruct the system 100 to provide the model input 202 again to the first generative AI model 210 to generate a new output (i.e., a third output). The third output can then be compared with the second output 222 by the classification model 230 to generate a second similarity indication. In this manner, the system 100 may check if the first output 212 not being relevant to the model input 202 is an outlier or if the first generative AI model 210 is consistently generating irrelevant outputs to the model input 202. To note, while a single iteration of rechecking the output of the first generative AI model 210 is described, the policy engine 270 may instruct the system 100 to perform any number of iterations of checking the outputs of the first generative AI model 210.

For example, the policy engine 270 may be configured to have the first generative AI model 210 generate a new output to the model input 202 a defined number of iterations as long as the classification model 230 generates a similarity indication 252 that the new output from the first generative AI model 210 is not similar to the second output 222. If one of the outputs is identified as similar to the second output 222, the policy engine 270 may instruct the system 100 to output that output for use. If the defined number of iterations is reached with all of the new outputs from the first generative AI model 210 being identified as not being similar to the second output, the policy engine 270 may instruct the system 100 to prevent all of the generated outputs from the first generative AI model 210 for the model input 202 from being output for use.

In some implementations, the policy engine 270 may execute other policies based on the similarity indication 252. For example, the policy engine 270 may instruct the system to log the dissimilarities identified as well as information regarding the dissimilarities (such as when the identification occurred, the model input 202 or information regarding the model input 202 (such as one or more keywords or topics) associated with the dissimilarity, the first output 212 associated with the dissimilarity, the degree of dissimilarity (such as a similarity metric generated by the NN classifier), and so on). Such information may be used to notify a developer or another as to when the first generative AI model 210 reaches a threshold level of irrelevance (such as a threshold number of dissimilarities, which may be counted in an overall manner or for specific topics or keywords). Such information may thus be used to limit the scope of topics or keywords for which the first generative AI model 210 is to be used, indicate or instruct the first generative AI model 210 to be retrained using an updated training set (or otherwise updating the first training set originally used to train the first generative AI model 210), or to notify a user as to the unreliability of the first generative AI model 210. Such logs may also be used to generate relevancy metrics for a plurality of different generative AI models (with the outputs of the second generative AI model 220 being compared to outputs of other generative AI models in addition to the first generative AI model) in order to compare the performance of different generative AI models for the inputs provided to such models. For example, as described in more detail below with reference to FIG. 5, the policy engine be used to compare generative AI models trained on different time ranges of training data to determine a consistency among outputs of the models in order to, e.g., adjust the defined time range of training data to be used to train a generative AI model or selecting a generative AI model to be used.

Figure 3:
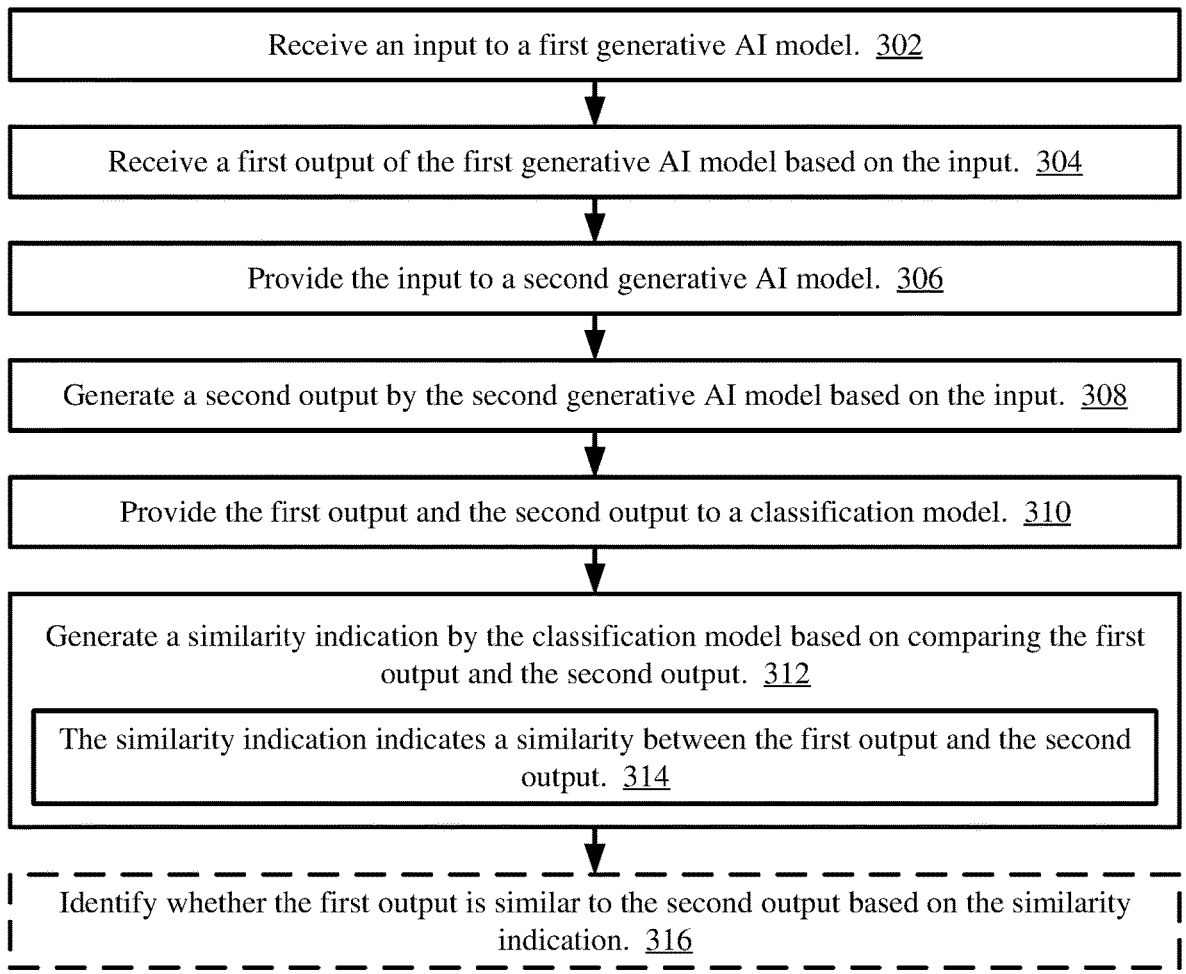
FIG. 3 shows an illustrative flow chart depicting an example operation of managing a generative AI model, according to some implementations.

FIG. 3 shows an illustrative flow chart depicting an example operation 300 of managing a generative AI model, according to some implementations. The example operation 300 is described as being performed by the computing system 100 for managing the first generative AI model 170 for clarity, with the configuration 200 of the components of the system 100 being used as an example implementation of the system 100.

At 302, the system 100 receives an input to the first generative AI model 170. For example, the system 100 receives the model input 202 that is to be provided to the first generative AI model 170 (as well as the second generative AI model 140). As noted above, the input may be received in any suitable manner, such as from a user prompt wherein the user provides the input, from another system hosting the first generative AI model 170, and so on.

At 304, the system 100 also receives the first output of the first generative AI model 170 based on the input. For example, the system 100 receives the first output 212 generated by the first generative AI model 210 after the model input 202 is provided to the first generative AI model 210. If the first generative AI model 210 is included in the system 100, receiving the first output 212 may include providing the model input 202 to the first generative AI model 210 and generating the first output 212 by the first generative AI model. If the first generative AI model 210 is external to the system 100, receiving the first output 212 may include receiving the output via the interface 110 of the system 100 from the other system hosting the first generative AI model 210. At 306, the system 100 provides the received input to the second generative AI model 140. For example, the model input 202 is provided to the second generative AI model 220 via an API of the model. At 308, the second generative AI model 140 generates a second output based on the input (such as the second generative AI model 220 generating the second output 222 in response to the model input 202 provided to the model 220).

With the first output generated by the first generative AI model 170 and obtained by the system 100 and the second output generated by the second generative AI model 140 based on the same input to the models 140 and 170, at 310, the system 100 provides the first output and the second output to the classification model 150. At 312, the classification model 150 generates a similarity indication based on comparing the first output and the second output. To note, the similarity indication indicates the similarity between the first output and the second output (314). For example, the similarity indication 252 may be a similarity metric (such as from 0 to 1) indicating a similarity between the first output vector 242 and the second output vector 244, or otherwise the similarity between the first output 212 and the second output 222.

In some implementations, the system 100 may also identify whether the first output is similar to the second output based on the similarity indication. For example, the similarity indication 252 may be compared to a threshold 254 by a comparator 260 to generate the identification 262, which may be a binary indication as whether the first output 212 is similar to the second output 222. As noted above, the similarity between the first output 212 and the second output 222 may be treated as an indication of the relevance between the first output 212 and the model input 202 by the policy engine 160 in managing the first generative AI model 170.

As noted in various examples above, managing the first generative AI model 170 may be based on one or more policies executed by the policy engine 160. For example, in some implementations, with the system 100 preventing the first output 212 from being output for use, the policy engine 160 may cause the system 100 to output the first output 212 for use (such as to a user or to another device) in response to the system 100 identifying that the first output 212 is similar to the second output 222 (and thus the first output 212 being relevant to the model input 202). Similarly, the policy engine 160 may cause the system 100 to prevent outputting the first output 212 in response to the system 100 identifying that the first output 212 is not similar to the second output 222 (and thus the first output 212 not being relevant to the model input 202). Additionally or alternatively, the policy engine 160 may cause the system 100 to output an indication that the first output 212 is not similar to the second output 222 (such as indicating that the first output 212 is not relevant to the model input 202) in response to identifying that the first output 212 is not similar to the second output 222. The policy engine 160 may also cause the system 100 to output the second output 222 for use (e.g., if a user requests or agrees to receiving the second output 222 based on the first output 212 identified as being irrelevant to the model input 202).

As noted above, an example set of policies of the policy engine 160 may include the system 100 double checking (or even checking in further iterations) as to whether the first output 212 is an outlier as to not being relevant to the model 202 in relation to other outputs of the first generative AI model 210, or if the first generative AI model 210 is generating irrelevant outputs for the model input 202 in general. Such a determination may be used to determine, e.g., whether the first generative AI model 210 is to be used for a specific topic, or even in general. Such a determination may also be used to determine whether the first generative AI model 210 is to be retrained or have the first training set adjusted, such as to include more recent training data after the first training set was closed. Such policies may thus optimize the performance of the first generative AI model 210.

Figure 4:
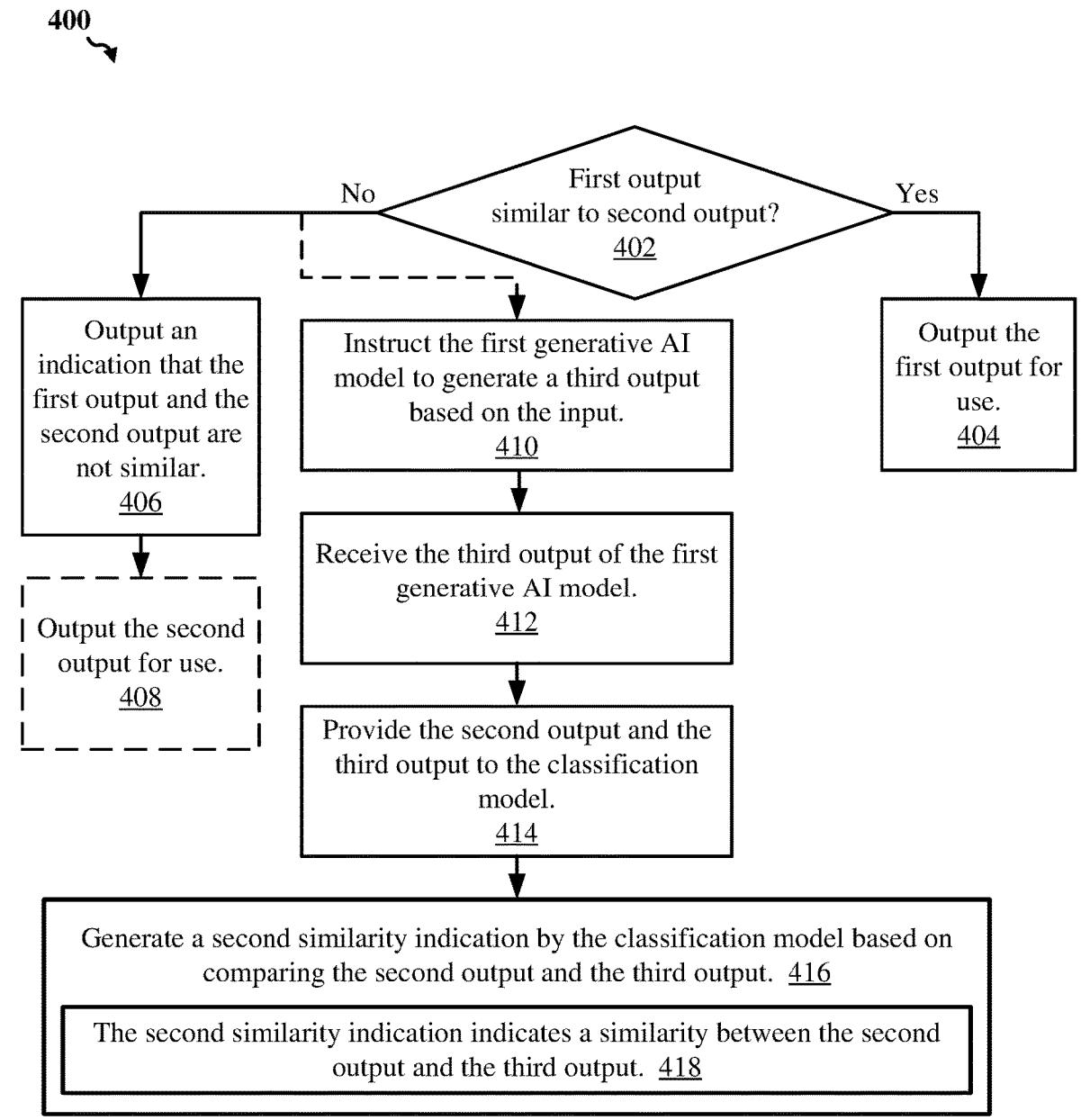
FIG. 4 shows an illustrative flow chart of an example operation of policies to optimize the performance of a generative AI model, according to some implementations.

FIG. 4 shows an illustrative flow chart of an example operation 400 of policies to optimize the performance of a generative AI model, according to some implementations. The example operation 400 is described as being performed by the computing system 100 for managing the first generative AI model 170 for clarity, with the configuration 200 of the components of the system 100 being used as an example implementation of the system 100. The policies are described as being implemented by the policy engine 160 to cause the system 100 to execute various operations to improve a user experience using the first generative AI model 170. Operation 400 may be performed in addition to operation 300 depicted in FIG. 3, with the system 100 identifying whether the first output 212 is similar to the second output 222 in block 316.

At decision block 402, if the first output 212 and the second output 222 are identified as being similar, the process flows to block 404. At 404, the policy engine 160 instructs the system 100 to output the first output 212 for use. The policy engine 160 may also instruct the system 100 to perform various other operations, such as outputting the similarity indication 252 or a suitable metric indicating the relevance of the first output 212 for the model input 202.

Referring back to decision block 402, if the first output 212 and the second output 222 are identified as not being similar, the process flows to block 406. At 406, the policy engine 160 instructs the system 100 to output an indication that the first output 212 and the second output 222 are not similar (thus indicating that the first output 212 is not relevant for the model input 202). The policy engine 160 may also instruct the system 100 to prevent output of the first output 212 for use based on identifying that the outputs are not similar. The first output 212 may be stored in the database 120 for later use (such as if requested by a user) or for records (such as for later debugging or testing of the first generative AI model 210 and the system 100 itself), or the first output 212 may be discarded by the system 100 (such as being removed the database 120 or another memory of the system 100). As noted above, a user may indicate his or her desire or willingness to receive the second output 222, with the understanding that the second output 222 may include questionable content as a result of the second generative AI model 220 not being manually reviewed and refined to the extent of the first generative AI model 210. As such, in some implementations, the policy engine 160 may cause the system 100 to output the second output 222 for use (408).

In addition or alternative to the process flowing to block 406 from decision block 402, the process may flow from decision block 402 to block 410. Blocks 410-418 are regarding policies that may be implemented by the policy engine 160 for the system 100 to double check (or further check in additional iterations) the outputs of the first generative AI model 210 to ensure that the first output 212 is not an outlier in not being relevant to the model input 202. At 410, the policy engine 160 may cause the system 100 to instruct the first generative AI model 210 to generate a third output based on the model input 202. For example, the system 100 may provide the model input 202 to the first generative AI model 210 or the system 100 may instruct a system hosting the first generative AI model 210 to provide the model input 202 to the first generative AI model 210 so that the first generative AI model 210 generates a third output (which is different than the first output 212). At 412, the system 100 receives the third output of the first generative AI model 210, which may be similar to receiving the first output 212 of the first generative AI model 210, such as described above with reference to block 304 of FIG. 3. At 414, the policy engine 160 may cause the system 100 to provide the second output 222 (which is previously generated by the second generative AI model 220 for the model input 202) and the third output (which is an additional output from the first generative AI model 210 for the same model input 202) to the classification model 150 (such as the classification model 230). At 416, the classification model generates a second similarity indication based on comparing the second output (from the second generative AI model) and the third output (from the first generative AI model). To note, the second similarity indication indicates a similarity between the second output and the third output (418). For example, the second similarity indication may be another instance of the similarity indication 252 for the different outputs being compared by the classification model 230. While not depicted in FIG. 4, in some implementations, the system 100 identifies whether the second output and the third output are similar based on the second similarity indication (such as similar to as described above with reference to block 316 depicted in FIG. 3).

Such a double check in blocks 410-418 may be performed (once or iteratively) before preventing an output from the first generative AI model from being output, thus determining that the first generative AI model 210 is generating irrelevant outputs for the model input 202 (instead of the first output 212 being an outlier regarding relevancy). Performing a double check provides greater confidence in determining that the first generative AI model 210 is generating irrelevant outputs for the model input 202 if multiple outputs are determined to be dissimilar to the second output 222 (instead of in the one off instance). Such a double check may also be valuable if, e.g., the natural language outputs of the generative AI models 210 or 220 may be in different formats or structures to cause the comparison between outputs to differ based on the structure of such answers. For example, varying the answer formatting may cause vectorization of the output to differ such that the comparison may differ. Thus, causing the first generative AI model to generate a new output may cause the formatting of the output to change, which may cause a change in vectorization and the comparison. While not depicted in FIG. 4, in some implementations, the policy engine 160 may also cause the system 100 to again provide the model input 202 to the second generative AI model 220 to generate a new output to be compared with the new output of the first generative AI model 210. The new output of the second generative AI model 220 may also be compared to the second output 222 by the classification model 230 to determine a similarity between the outputs (and thus a consistency in the answers from the second generative AI model).

Referring back to block 410, in some implementations of instructing the first generative AI model to generate a third input, the model input 202 may be adjusted before again being provided to the first generative AI model 210. For example, the model input 202 may be concatenated with the second output 222 (such as indicating to the first generative AI model in the model input 202 that a different model provided an included answer of the second output 222). In this manner, the first generative AI model 210 may receive additional content and context from the adjusted model input 202 that might cause the first generative AI model 210 to generate a third output that is more similar to the second output 222 than the first output 212 is to the second output 222.

As described in various examples above, the system 100 may be implemented to manage a single generative AI model. In some implementations, though, the system 100 may also be implemented to manage a plurality of generative AI models (and not just a first generative AI model 170), such as in selecting a best generative AI model from a set of generative AI models for use or adjusting the training data to the most relevant time ranges of data for training a generative AI model for use. In this manner, system 100 may be used in the original generation or training of a generative AI model before the generative AI model is to be manually reviewed and refined in an attempt to expedite the review and refinement process. Alternatively, the system 100 may be used in selecting a best generative AI model from a set of candidate generative AI models based on comparison of the candidate model outputs to the outputs of the second generative AI model of the system 100 (or to each other). Through adjusting the training data or selecting a best generative AI model for use, the system 100 may optimize the performance of a generative AI model as seen by an end user (from which the difference in training data or the difference in candidate models is obfuscated).

Figure 5:
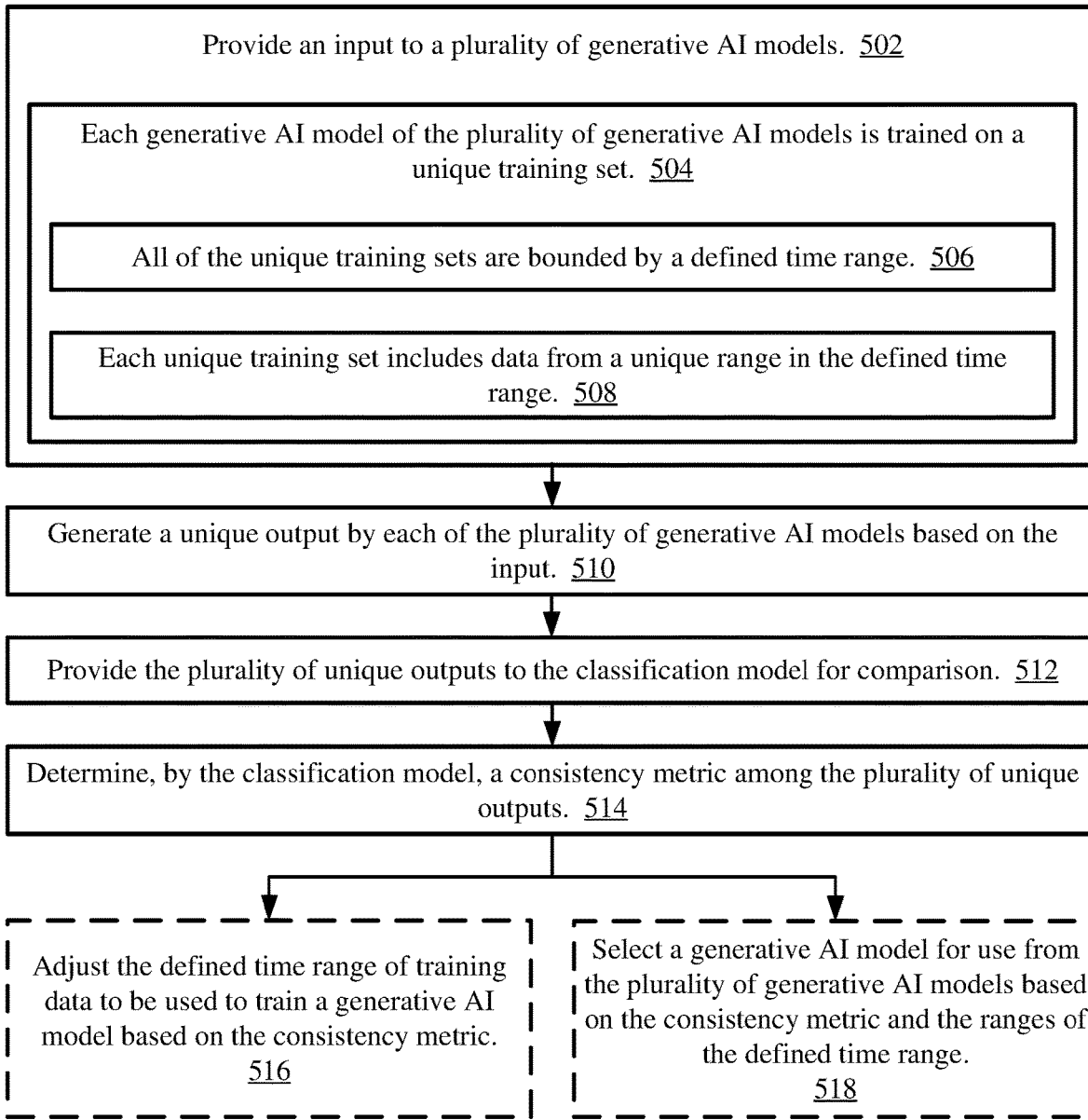
FIG. 5 shows an illustrative flow chart of an example operation of optimizing the performance of a generative AI model based on outputs of a plurality of generative AI models, according to some implementations.

FIG. 5 shows an illustrative flow chart of an example operation 500 of optimizing the performance of a generative AI model based on outputs of a plurality of generative AI models, according to some implementations. The operation 500 is described as being performed by the system 100 for clarity, with the system 100 including or communicating with a plurality of generative AI models (including the first generative AI model 170) that are managed by the system 100. Operation 500 may be performed by the system 100 to determine a similarity between outputs and thus a consistency across outputs from a plurality of generative AI models to be managing, with managing the generative AI models being based on such measured consistency.

In an example of a plurality of generative AI models to be managed by the system 100, for training data spanning a defined time range (such as the last, e.g., 10 years), an instance of a generative AI model may be trained on a unique training set that includes data in a unique time range of the defined time range. For example, the plurality of generative AI models may include a first instance of the generative AI model (i.e., a first generative AI model) trained on training data of years 1-2 of the 10 years of training data, a second instance of the generative AI model (i.e., a second generative AI model) trained on training data of years 2-3 of the 10 years of training data, a third instance of the generative AI model (i.e., a third generative AI model) trained on training data of years 3-4 of the 10 years of training data, and so on to a tenth generative AI model trained on training data of year 10 only (or year 1 and year 10) of the 10 years of training data. In some implementations, the plurality of generative AI models may include additional models trained on different time ranges of data within the 10 year time range (such as the entire 10 year time range, time ranges of three years or more years, and so on with each generative AI model being associated with a unique time range of training data (and thus a unique training set for training the generative AI model). Operation 500 may be performed for the plurality of generative AI models to, e.g., adjust the training data to optimize training of a generative AI model or select the best generative AI model from the plurality of generative AI models for use. The above example of the 10 generative AI models trained using two year training data chunks over a 10 year span is used in describing operation 500 below for clarity.

At 502, the system 100 provides an input to a plurality of generative AI models. For example, referring back to FIG. 2, the first generative AI model 210 may be a first generative AI model from the plurality of generative AI models, and the second generative AI model 220 may be a second generative AI model from the plurality of generative AI models. The system 100 may also include (or communicate with) a third and other generative AI models from the plurality of generative AI models. Each generative AI model of the plurality of generative AI models is trained on a unique training set (504). All of the unique training sets are bounded by a defined time range (506). In this manner, the first training set for the first generative AI model, the second training set for the second generative AI model, and so on to the last training set of the last generative AI model of the plurality of generative AI models include data in a defined time range. For example, the first training set includes data from a first range in the defined time range (such as years 1 and 2 of a 10 year time range of training data), the second training set includes data from a second range in the defined time range (such as years 2 and 3 of the 10 year time range of training data), and so on to the tenth training set including data from a tenth range in the defined time range (such as year 10 or both year 10 and year 1 of the 10 year time range of training data).

Each unique training set includes data from a unique time range in the defined time range (508). For example, the time range of years 1-2 of training data corresponds only to the first generative AI model, the time range of years 2-3 of training data corresponds only to the second generative AI model, and so on. To note, while the ranges may or may not overlap with each other, the ranges in their totality are unique to all of the other ranges in their totality. In this manner, the corpus of training data used to train the generative AI model differs from the corpora of other training data used to train the other generative AI models.

At 510, with the input (such as the model input 202) provided to each of the plurality of generative AI models, each of the plurality of generative AI models generates a unique output based on the input. For example, the first generative AI model generates a first output, the second generative AI model generates a second output, the third generative AI model generates a third output, and so on to a tenth generative AI model generating a tenth output in response to the model input 202 provided to each of the generative AI models. The system 100 thus obtains the unique outputs from the plurality of generative AI models.

With the unique outputs generated by the plurality of generative AI models obtained by the system 100, the system 100 is to compare the outputs to one another. At 512, the system 100 provides the plurality of unique outputs to the classification model 150 for comparison. In some implementations, the system 100 is configured to provide each pair of outputs from the plurality of unique outputs to the classification model 150 to generate a similarity indication for each unique pair of outputs. In this manner, for 10 unique outputs generated by 10 generative AI models (such as in the above example), the first output and the second output may be provided to the classification model 150 in one instance to generate a first similarity indication, the first output and the third output may be provided to the classification model 150 in another instance to generate a second similarity indication, and so on until all 45 similarity indications for all of the unique pairs of outputs are generated by the classification model 150.

At 514, the classification model 150 determines a consistency metric among the plurality of unique outputs. In the above example of ten generative AI models generating ten unique outputs for a common model input, with the classification model 150 generating the 45 similarity indications (such as 45 similarity metrics on a scale from 0 to 1), the classification model 150 may measure whether one or more of the unique outputs differs from the other unique outputs based on the similarity indications. For example, the classification model 150 may compare the similarity indications to a similarity threshold. With each of the ten generative AI models being associated with nine similarity indications (with its own output compared to each of the other nine generative AI models' outputs), each generative AI model may be associated with nine indications as to whether its output is similar to one of the other generative AI model's output. In some implementations, a consistency metric may include the sum of the positive indications for a generative AI model. For example, the classification model 150 may sum the number of positive similarities (with the similarity indication being greater than the similarity threshold) as a consistency metric for the respective generative AI model. A low sum (such as the consistency metric being greater than a consistency threshold) may indicate that the outputs from the respective generative AI model is inconsistent with the outputs from the other generative AI models. To note, the consistency threshold may be determined in any suitable manner. For example, the consistency threshold may be the maximum number of positive similarities for any of the generative AI models. In other examples, the consistency threshold may be an average number of positive similarities across the generative AI models, a value defined by the developer or a user, a value based on a gap between the number of positive similarities for the plurality of generative AI models whose number of positive similarities is ordered from largest to smallest (such as from a maximum of nine to a minimum of 0, with a gap between the numbers being greater than a threshold indicating a location in the scale as a consistency threshold to use), and so on.

Based on the consistency metric, the policy engine 160 may implement various policies to cause the system 100 to perform one or more operations in managing the plurality of generative AI models. In some implementations of managing the plurality of generative AI models, the policy engine 160 may cause the system 100 to adjust the defined time range of training data to be used to train a generative AI model based on the consistency metric (516). Adjusting the defined time range may include, e.g., removing portions of the defined time range or adjusting the upper or lower bounds of the defined time range. For example, a consistency threshold of 3 for the ten generative AI models may be used to compare to the consistency metric for each of the ten generative AI models. In an example, the consistency metrics for the second generative AI model (which is trained using data from years 2-3 of the 10 year span of training data) and the third generative AI model (which is trained using data from years 3-4 of the 10 year span of training data) may not meet the threshold. As such, the system 100 may determine if a common time span exists between the training sets used to train those generative AI models (e.g., year 3 in the 10 year span) and remove the common time span (and thus the training data from that time) from the defined time span. In this manner, the ten year time span may be shrunk to include years 1-2 and years 4-10. With the time span shrunk, the training data in the shrunken time span may be used to train a new generative AI model for use.

A benefit of such adjustment of the time span is that data from specific times may be removed from the training data. For example, in current events, news of a recent event may be incorrect until additional facts are learned and reported (which may be days, weeks, months, years, or even decades later). As a result, data that may be collected for a training set may include the incorrect information if collected during the time of the current event or immediately thereafter. Adjusting the time span of the training data allows the removal of such erroneous information. In another example, laws may be enacted, updated, and even reverted in a jurisdiction. As a result, legislative documents from a specific time period may become out of date due to changes in laws. Adjusting the time span of the training data allows the removal of such out of date information. In this manner, the relevancy of the training data may be optimized in order to improve the training of the generative AI model for use.

In some other implementations of managing the plurality of generative AI models, the policy engine 160 may cause the system 100 to select a generative AI model for use from the plurality of generative AI models based on the consistency metric and the ranges of the defined time range (518). For example, the policy engine 160 may cause the system 100 to identify which output from the plurality of unique outputs generated to provide to a user in response to the input to the models. The identification of the output may be based on one or more of the consistency metric across the plurality of generative AI models and the age of the training data for the training sets. For example, the policy engine 160 may implement a policy that the most consistent output associated with the newest training data is to be output to a user by the system 100. In a specific example, the policy engine 160 may cause the system 100 to identify the greatest consistency metric (such as the sum closest to the maximum value of nine in the above example). If a plurality of consistency metrics are the same and the greatest (such as multiple consistency metrics equaling nine in the above example), the policy engine 160 may cause the system 100 to select the generative AI model associated with the youngest time span for training the generative AI model and thus provide the output from the selected generative AI model to the user. For example, if the fifth generative AI model associated with a training set from a time span of years 5-6 of training data and the ninth generative AI model associated with a training set from a time span of years 9-10 of training data are associated with the same greatest consistency metric, the policy engine 160 may cause the system 100 to output the unique output from the ninth generative AI model for use.

A benefit of such a selection of a generative AI model from a plurality of generative AI models is that, if content from specific time spans are better suited for specific topics, different generative AI models may be better trained to answer inputs regarding those specific topics. As such, each of the different generative AI models trained using the unique training sets associated with unique time spans may be specialized through training for answering inputs om specific topics. In some other implementations, the plurality of generative AI models may be candidates for further review and refinement for use. As such, selecting the generative AI model based on the consistency metric may allow the best trained generated AI model to be manually reviewed such that the amount of manual review and refinement may be reduced. While some example policies of managing a plurality of generative AI models are described above, other suitable policies may be implemented by the policy engine 160. As such, the policies are not limited to those depicted in FIG. 5 or described above.

As described herein, a system 100 may be implemented to include a generative AI model to manage another generative AI model to ensure the outputs of the managed generative AI model are still relevant. As such, outputs provided to a user may be improved to improve a user experience with a generative AI model. Additionally or alternatively, the generative AI model may be improved (such as through retraining or limiting the scope of answers from the model) to improve a user experience with the model. For example, through such management, the number of irrelevant answers to a query (which may include hallucinations, out of date information, and so on) may be reduced.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for training a text generative artificial intelligence (AI) model, comprising:
    generating a first training set for training a first text generative AI model, wherein generating the first training set includes selecting text existing during a first time span to be included in the first training set, wherein all text to be included in the first training set exists during the first time span;
    training the first text generative AI model on the first training set;
    providing a text input to the first text generative AI model;
    generating a first text output by the first text generative AI model based on the text input;
    generating a second training set for training a second text generative AI model, wherein generating the second training set includes selecting text existing during a second time span to be included in the second training set, wherein:
        at least a portion of the second time span is subsequent to the first time span; and
        at least some text to be included in the second training set is created during the second time span and after the first time span;
    training the second text generative AI model on the second training set;
    providing the text input to the second text generative AI model;
    generating a second text output by the second text generative AI model based on the text input;
    providing the first text output and the second text output to a text classification model;
    generating a similarity indication by the text classification model based on comparing the first text output and the second text output, wherein the similarity indication indicates a similarity between the first text output and the second text output;
    adjusting the first training set for training the first text generative AI model based on the similarity indication, wherein adjusting the first training set includes expanding the first time span and selecting new text in the expanded first time span to be included in the adjusted first training set; and
    training the first text generative AI model on the adjusted first training set.

2. The method of claim 1, further comprising identifying whether the first text output is similar to the second text output based on the similarity indication, wherein adjusting the first training set is based on the first text output not being similar to the second text output.

3. The method of claim 2, further comprising outputting the first text output for use in response to identifying that the first text output is similar to the second text output.

4. The method of claim 2, further comprising:
    in response to identifying that the first text output is not similar to the second text output, instructing the first text generative AI model to generate a third text output based on the text input;
    generating the third text output by the first text generative AI model;
    providing the second text output and the third text output to the text classification model; and
    generating a second similarity indication by the text classification model based on comparing the second text output and the third text output, wherein:
        the second similarity indication indicates a similarity between the second text output and the third text output; and
        adjusting the first training set is based on the second similarity indication.

5. The method of claim 2, further comprising, in response to identifying that the first text output is not similar to the second text output, outputting an indication that the first text output is not similar to the second text output.

6. The method of claim 5, further comprising outputting the second text output for use based on identifying that the first text output is not similar to the second text output.

7. The method of claim 2, wherein the text classification model includes a bidirectional encoder representations from transformers (BERT) model coupled to a neural network model trained to classify whether two text inputs to the text classification model are similar.

8. The method of claim 1, further comprising:
providing the text input to one or more additional text generative AI models, wherein:
- each additional text generative AI model of the one or more additional text generative AI models is trained on a unique training set;
- the first training set, the second training set, and the one or more unique training sets include data in a defined time range;
- the first training set includes data from a first range in the defined time range;
- the second training set includes data from a second range in the defined time range;
- each of the one or more unique training sets includes data from a unique range in the defined time range; and
- the first range, the second range and each unique range are unique from one another in the defined time range;

generating a unique text output by each of the one or more additional text generative AI models based on the text input;
providing the one or more unique text outputs to the text classification model to compare with the first text output and the second text output; and
determining, by the text classification model, a consistency metric among the first text output, the second text output, and the one or more unique text outputs, wherein adjusting the first training set is based on the consistency metric.

9. The method of claim 8, further comprising adjusting the defined time range of training data to be used to train a text generative AI model based on the consistency metric.

10. The method of claim 8, further comprising selecting a text generative AI model for training and use based on the consistency metric and the ranges of the defined time range.

11. A system for training a text generative artificial intelligence (AI) model, the system comprising:
one or more processors; and
a memory storing instructions that, when executed by the one or more processors, causes the system to perform operations comprising:
- generating a first training set for training a first text generative AI model, wherein generating the first training set includes selecting text existing during a first time span to be included in the first training set, wherein all text to be included in the first training set exists during the first time span;
- training the first text generative AI model on the first training set;
- providing a text input to the first text generative AI model;
- generating a first text output by the first text generative AI model based on the text input;
- generating a second training set for training a second text generative AI model, wherein generating the second training set includes selecting text existing during a second time span to be included in the second training set, wherein:
  - at least a portion of the second time span is subsequent to the first time span; and
  - at least some text to be included in the second training set is created during the second time span and after the first time span;
- training the second text generative AI model on the second training set;
- providing the text input to the second text generative AI model;
- generating a second text output by the second text generative AI model based on the text input;
- providing the first text output and the second text output to a text classification model;
- generating a similarity indication by the text classification model based on comparing the first text output and the second text output, wherein the similarity indication indicates a similarity between the first text output and the second text output;
- adjusting the first training set for training the first text generative AI model based on the similarity indication, wherein adjusting the first training set includes expanding the first time span and selecting new text in the expanded first time span to be included in the adjusted first training set; and
- training the first text generative AI model on the adjusted first training set.

12. The system of claim 11, wherein the operations further comprise identifying whether the first text output is similar to the second text output based on the similarity indication, wherein adjusting the first training set is based on the first text output not being similar to the second text output.

13. The system of claim 12, wherein the operations further comprise outputting the first text output for use in response to identifying that the first text output is similar to the second text output.

14. The system of claim 12, wherein the operations further comprise:
- in response to identifying that the first text output is not similar to the second text output, instructing the first text generative AI model to generate a third text output based on the text input;
- generating the third text output by the first text generative AI model;
- providing the second text output and the third text output to the text classification model; and
- generating a second similarity indication by the text classification model based on comparing the second text output and the third text output, wherein:
  - the second similarity indication indicates a similarity between the second text output and the third text output; and
  - adjusting the first training set is based on the second similarity indication.

15. The system of claim 12, wherein the operations further comprise, in response to identifying that the first text output is not similar to the second text output, outputting an indication that the first text output is not similar to the second text output.

16. The system of claim 15, wherein the operations further comprise outputting the second text output for use based on identifying that the first text output is not similar to the second text output.

17. The system of claim 12, wherein the text classification model includes a bidirectional encoder representations from transformers (BERT) model coupled to a neural network model trained to classify whether two text inputs to the text classification model are similar.

18. The system of claim 11, wherein the operations further comprise:
providing the text input to one or more additional text generative AI models, wherein:
each additional text generative AI model of the one or more additional text generative AI models is trained on a unique training set;
the first training set, the second training set, and the one or more unique training sets include data in a defined time range;
the first training set includes data from a first range in the defined time range;
the second training set includes data from a second range in the defined time range;
each of the one or more unique training sets includes data from a unique range in the defined time range; and
the first range, the second range and each unique range are unique from one another in the defined time range;
generating a unique text output by each of the one or more additional text generative AI models based on the text input;
providing the one or more unique text outputs to the text classification model to compare with the first text output and the second text output; and
determining, by the text classification model, a consistency metric among the first text output, the second text output, and the one or more unique text outputs, wherein adjusting the first training set is based on the consistency metric.

19. The system of claim 18, wherein the operations further comprise adjusting the defined time range of training data to be used to train a text generative AI model based on the consistency metric.

20. The system of claim 18, wherein the operations further comprise selecting a text generative AI model for training and use based on the consistency metric and the ranges of the defined time range.

* * * * *